United States Patent
Henderson et al.

(10) Patent No.: US 11,587,111 B2
(45) Date of Patent: *Feb. 21, 2023

(54) METHODS AND SYSTEMS FOR AUTOMATICALLY TESTING AND APPLYING CODES TO ELECTRONIC SHOPPING CARTS

(71) Applicant: Capital One Services, LLC, McLean, VA (US)

(72) Inventors: William George Henderson, Austin, TX (US); Kace Layton, Austin, TX (US); Dallas Duncan, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,323

(22) Filed: Feb. 26, 2021

(65) Prior Publication Data
US 2021/0182892 A1    Jun. 17, 2021

Related U.S. Application Data

(63) Continuation of application No. 16/698,015, filed on Nov. 27, 2019, now Pat. No. 10,937,046.

(51) Int. Cl.
G06Q 30/02 (2012.01)
G06Q 30/06 (2012.01)
(Continued)

(52) U.S. Cl.
CPC ..... *G06Q 30/0222* (2013.01); *G06Q 30/0641* (2013.01)

(58) Field of Classification Search
CPC ............ G06Q 30/0222; G06Q 30/0641; G06F 11/3688; G06F 40/205; G06F 11/3692
See application file for complete search history.

(56) References Cited

U.S. PATENT DOCUMENTS 9,514,475 B2 * 12/2016 Choong Cheng Shien ................ G06Q 30/0222
9,727,891 B2   8/2017 Mezzacca
(Continued)

FOREIGN PATENT DOCUMENTS

AU   2013200110 A1   7/2013
CN   110111107 A  *  8/2019 ........... G06Q 20/387

OTHER PUBLICATIONS

Nielsen, Jakob, "Response Times: The 3 Important Limits", Nielsen Norman Group, Jan. 1, 1993, archived at https://web.archive.org/web/20150227223552/http://www.nngroup.com:80/articles/response-times-3-important-limits (Year: 1993).*
(Continued)

*Primary Examiner* — Kambiz Abdi
*Assistant Examiner* — Scott Snider
(74) *Attorney, Agent, or Firm* — Bookoff McAndrews, PLLC

(57) ABSTRACT

Disclosed are methods, systems, and non-transitory computer-readable medium for automatically testing and applying codes to electronic shopping carts. For instance, the method may include: monitoring a browsing session of a user on an e-commerce website; determining whether a trigger condition is present based on the monitoring; when the determining determines the trigger condition is present, automatically performing a code test process for a first set of codes to obtain a first test result, the first set of codes being one or more codes among a plurality of codes for the e-commerce website; and upon completion of the code test process for the first set of codes, displaying a first menu, the first menu including information corresponding to the first test result.

14 Claims, 11 Drawing Sheets

(51) Int. Cl.
G06Q 30/0207 (2023.01)
G06Q 30/0601 (2023.01)

(56) References Cited

U.S. PATENT DOCUMENTS

| | | | |
|---|---|---|---|
| 9,922,327 B2 | 3/2018 | Johnson et al. | |
| 10,497,046 B2 | 12/2019 | Dabral et al. | |
| 2003/0004798 A1* | 1/2003 | McAuliffe | G06Q 30/0601 705/26.1 |
| 2008/0046337 A1* | 2/2008 | Tarvydas | G06Q 30/0609 705/26.81 |
| 2011/0153401 A1* | 6/2011 | Jellema | G06Q 30/02 705/14.26 |
| 2013/0085807 A1 | 4/2013 | Cincotta | |
| 2013/0138495 A1 | 5/2013 | Lemphers et al. | |
| 2014/0074584 A1* | 3/2014 | Fisher | G06Q 30/0207 705/14.39 |
| 2014/0114755 A1* | 4/2014 | Mezzacca | G06Q 20/387 705/14.51 |
| 2017/0186027 A1 | 6/2017 | Hudson et al. | |

OTHER PUBLICATIONS

Rick Broida, "How to find discount codes for (almost) everything you buy", Jul. 20, 2016, CNET.com, http://web.archive.org/web/20160809112044/https://www.cnet.com/how-to/how-to-find-discount-codes-for-almost-everything-you-buy/ (Year: 2016).

Jacqueline Curtis, "8 Best Mobile Coupon Apps to Save Money Shopping With Your Smartphone", archived on Aug. 8, 2016, moneycrashers.com, http://web.archive.org/web/20160808135911/http://www.moneycrashers.com/best-mobile-coupon-apps-smartphone (Year: 2016).

* cited by examiner

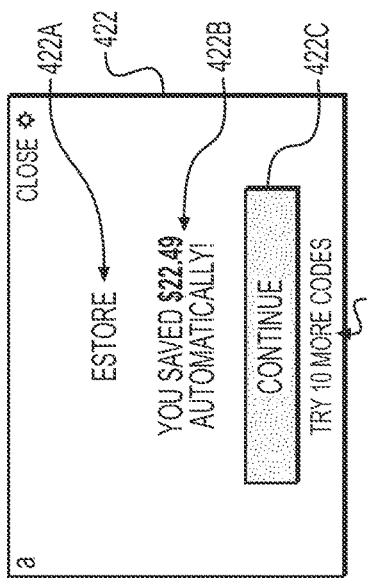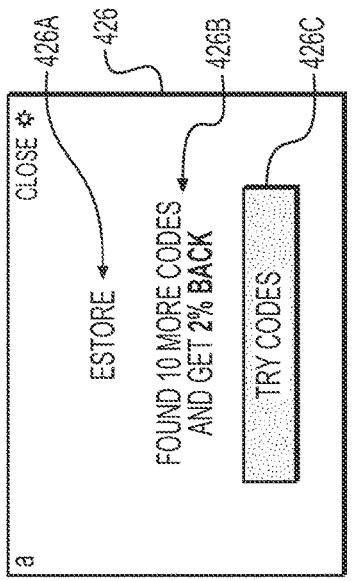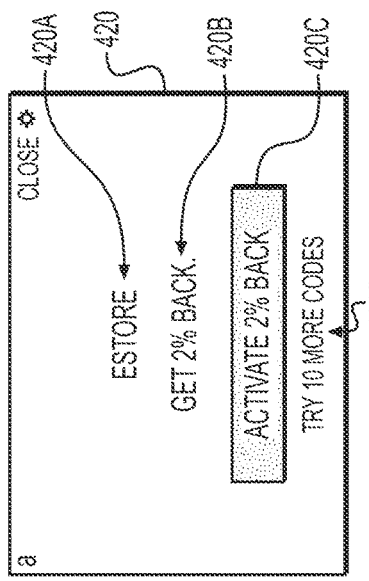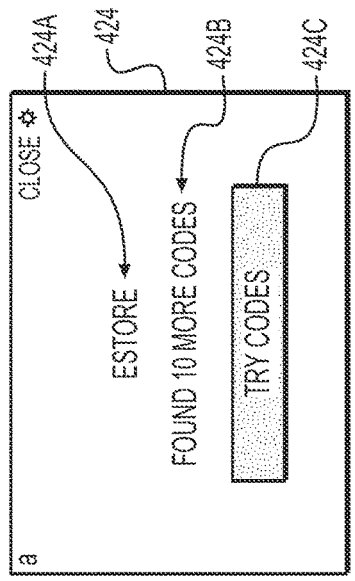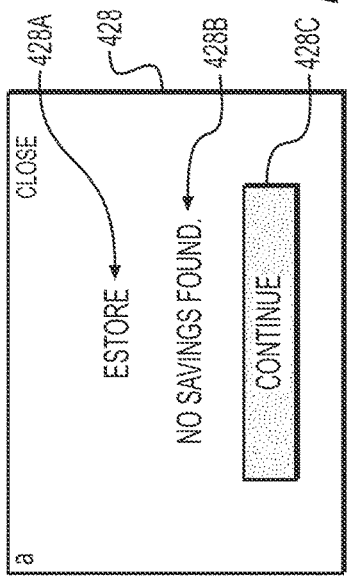

METHODS AND SYSTEMS FOR AUTOMATICALLY TESTING AND APPLYING CODES TO ELECTRONIC SHOPPING CARTS

CROSS-REFERENCE TO RELATED APPLICATION(S)

This patent application is a continuation of U.S. patent application Ser. No. 16/698,015, filed on Nov. 27, 2019, the entirety of which is incorporated herein by reference.

TECHNICAL FIELD

Various embodiments of the present disclosure relate generally to methods and systems for testing and applying codes to electronic shopping carts and, more particularly, to methods and systems for automatically testing and applying codes to electronic shopping carts.

BACKGROUND

Generally, customers (or a browser extension of a browser for the customers) apply coupon or promotional codes to test the codes on e-commerce websites during a checkout process. However, applying the codes to test the codes during the checkout process may cause delays during the checkout process. For instance, delays may be caused by requiring the customer to be at an appropriate step in the checkout process to test the codes, may require the customer to manually enter and remove codes one at a time in order to compare a potential value of the codes, and since the testing the codes may require a certain amount of time, the entire checkout process may be delayed by the certain amount of time. Therefore, there is a challenge in testing for codes and not unduly generating delay in customers checkout processes.

Moreover, in the case of a browser extension performing the code testing for the customer, the browser extension may display a notification to test codes for the customer. However, a substantial proportion of customers that may be prompted via the notification to test codes while shopping online may not engage with the notification, whether because of insufficient knowledge or inclination to engage—thereby preventing the opportunity to take advantage of the savings from the codes findable by the browser extension. Therefore, there is a challenge in completing processes to find and convert codes into savings for customers using browser extensions.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for automatic code testing.

For instance, a method for automatic code testing may include: monitoring a browsing session of a user on an e-commerce website; determining whether a trigger condition is present based on the monitoring; when the determining determines the trigger condition is present, automatically performing a code test process for a first set of codes to obtain a first test result, the first set of codes being one or more codes among a plurality of codes for the e-commerce website; and upon completion of the code test process for the first set of codes, displaying a first menu, the first menu including information corresponding to the first test result.

A system for automatic code testing may include a memory storing instructions; and a processor executing the instructions to perform a process. The process may include: monitoring a browsing session of a user on an e-commerce website; determining whether a trigger condition is present based on the monitoring; when the determining determines the trigger condition is present, automatically performing a code test process for a first set of codes to obtain a first test result, the first set of codes being one or more codes among a plurality of codes for the e-commerce website; and upon completion of the code test process for the first set of codes, displaying a first menu, the first menu including information corresponding to the first test result.

A method for automatic code testing may include: monitoring a browsing session of a user on an e-commerce website; determining whether a trigger condition is present based on the monitoring; when the determining determines the trigger condition is present, automatically performing a code test process for a first set of codes to obtain a first test result, the first set of codes being one or more codes among a plurality of codes for the e-commerce website; upon completion of the code test process for the first set of codes, displaying a first menu, the first menu including information corresponding to the first test result, the first menu including a continue testing indicator when the first set of codes does not include all of the plurality of codes, the continue testing indicator being selectable by a user input to test a second set of codes, the second set of codes corresponding to a remainder of the plurality of codes not included in the first set of codes; in response to receiving the user input to test the second set of codes, performing the code test process for the second set of codes to obtain a second test result; and upon completion of the code test process for the second set of codes, displaying a second menu, the second menu including information corresponding to the second test result.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4H depict graphical user interfaces (GUIs) for automatically testing and applying codes, according to one or more embodiments.

DETAILED DESCRIPTION OF EMBODIMENTS

Figure 1:
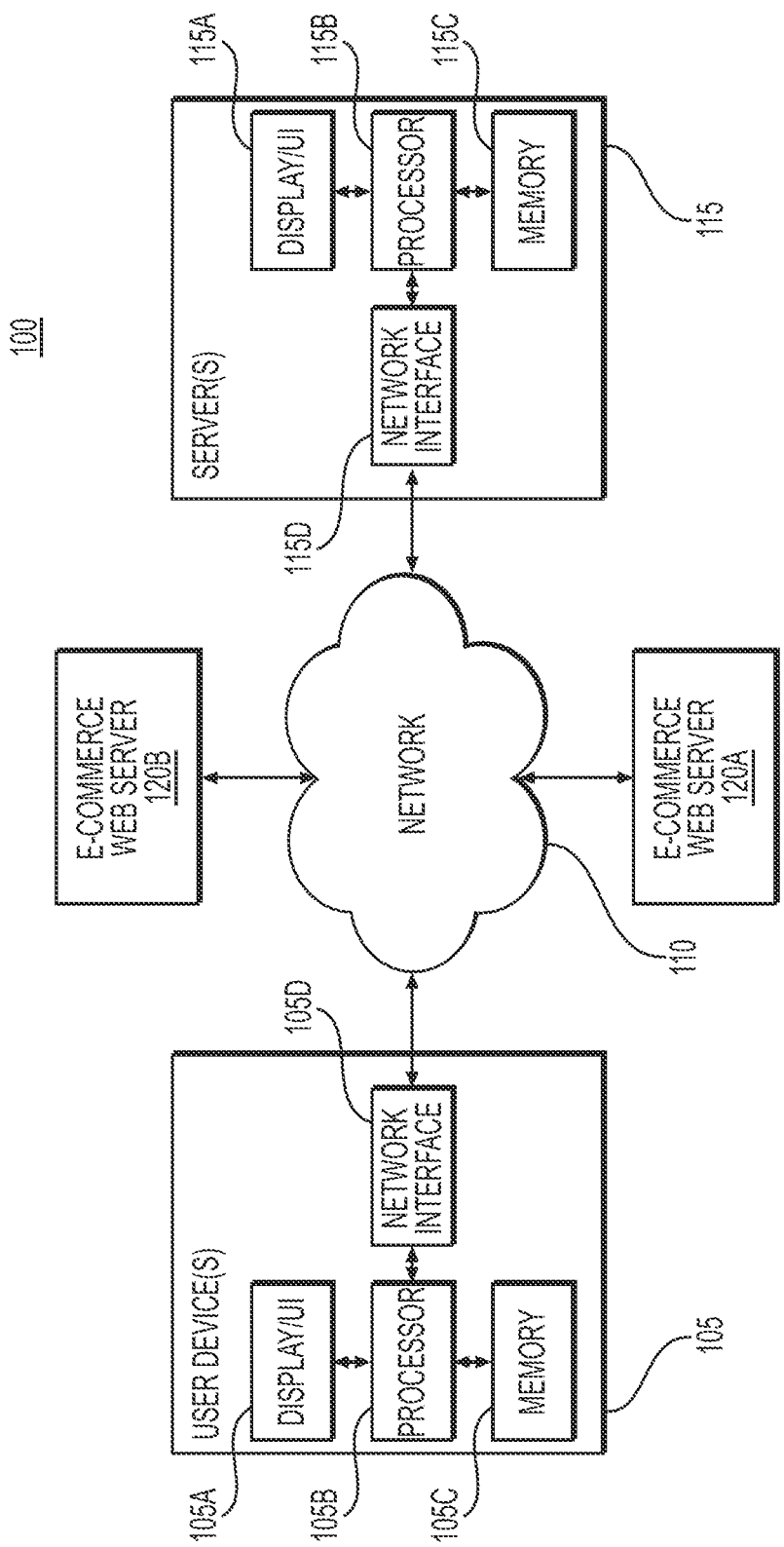
FIG. 1 depicts an exemplary system for automatically testing and applying codes, according to one or more embodiments.

Various embodiments of the present disclosure relate generally to methods and systems for testing and applying codes to electronic shopping carts.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for automatically testing codes in response to a trigger condition, as discussed in more detail herein. A system of the present disclosure may monitor a user's browsing session and determine whether a trigger condition is present; and in response to the trigger condition being present, automatically perform a code test process for a first set of codes for an e-commerce website. The trigger condition may be a web page that has a code input field such that a code test process may be executed in association with the code input field of the web page for the user. The first set of codes may be one or more codes of a plurality of codes for the e-commerce website. The first set of codes may include codes that have a high potential (e.g., likelihood of success, average savings, recently used, etc.) of providing savings for a user. The first set of codes may be selected so as to increase chances to find savings and also ensure that a user browsing/checking out on the e-commerce website is not delayed unduly. For instance, the first set of codes may be selected so that the code test process for the first set of codes may not exceed a threshold period of time (e.g., on average). As an example, the system of the present disclosure may determine a number of codes to test in the first set of codes based on an average time to test a code for an e-commerce website and a threshold period of time. The threshold period of time may be set considering a user experience for an e-commerce website.

The system of the present disclosure may perform the code test process to determine a test result for the first set of codes. The system of the present disclosure may display a menu based on the test result. The menu may indicate (automatically, as the code test process is executed automatically) potential savings and/or rewards available to the user. The menu may also indicate whether there are more codes to test for the e-commerce website (e.g., a second set of codes), and a user may optionally choose to perform the further code testing to see if greater/better savings and/or rewards are available. The system of the present disclosure may, in response to a user choosing to perform the further testing, execute a second code test process for the second set of codes. The second set of codes may be all remaining codes of the plurality of codes for the e-commerce website that are not included in the first set of codes. Therefore, the system of the present disclosure may effectively remove an engagement step in the savings conversion funnel for users of the system of the present disclosure. The removal of an engagement step in the savings conversion funnel for users of the system of the present disclosure may cause a marked increase in coupon savings for users of the system of the present disclosure. Further, the system of the present disclosure may avoid unduly delaying users while the users browse or check out.

FIG. 1 depicts an exemplary system 100 for automatically testing and applying codes, according to one or more embodiments. The system 100 may include one or more user device(s) 105, a network 110, one or more server(s) 115, and one or more e-commerce web servers, such as, for example, e-commerce web servers 120A and 120B. The user device 105, the server 115, and the plurality of e-commerce web servers 120A and 120B may be connected via the network 110, using one or more standard communication protocols. The network 110 may be one or a combination of the Internet, a local network, or other network. The user device 105 and the server 115 may transmit and receive messages from each other across the network 110.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S) and at least one instance of a code management program (each stored in memory 115C). The code management program may provide information to and/or perform processing for one or more user devices, such as the user device 105, as discussed in more detail below. The memory 115C may also store the code management program, e-commerce website information, and/or code information. The e-commerce website information may include information regarding e-commerce websites for which the user device 105 is to perform the automatic code testing, as discussed in detail below. The code information may include information for a plurality of codes (e.g., coupon or promotional codes) associated with one or more e-commerce websites hosted by one or more of the e-commerce web servers 120A and/or 120B. The display/UI 115A may be a touch screen or a display with other input systems (e.g., mouse, keyboard, etc.) for an operator of the server 115 to control the functions of the server 115 (e.g., update the code management program, the e-commerce website information, and/or the code information). The network interface 115D may be an TCP/IP network interface for, e.g., Ethernet or wireless communications with the network 110.

The user device 105 may include a display/UI 105A, a processor 105B, a memory 105C, and/or a network interface 105D. The user device 105 may be a computer, a cell phone, a tablet, etc. The user device 105 may execute, by the processor 105B, an operating system (O/S) and at least one application (each stored in memory 105C). The application may be a browser program or a mobile application program (which may also be a browser program in a mobile O/S). The application may generate one or more graphic user interfaces (GUIs) based on instructions/information stored in the memory 105C and/or instructions/information received from the server 115 and/or the plurality of e-commerce web servers 120A and/or 120B. The GUIs may, for instance, be web pages executed based on HTML, CSS, and/or scripts, such as JavaScript, but one skilled in the art would recognize that this may be accomplished by other methods, such as XML and Android programming languages or Objective-C/ Swift. The display/UI 105A may be a touch screen or a display with other input systems (e.g., mouse, keyboard, etc.). The network interface 105D may be an TCP/IP network interface for, e.g., Ethernet or wireless communications with the network 110. The processor 105B, while executing the application, may receive user inputs from the display/UI 105A, and perform actions or functions in accordance with the application.

The application (e.g., a browser program) may be a software application that may be used by a user to access and interact with websites hosted by one or more of the plurality of e-commerce web servers 120A and 120B over network 110. In at least one embodiment, a user may view and interact with the websites hosted by one or more of the plurality of e-commerce web servers 120A and 120B via the application, for example, by clicking on links or graphical user elements to view items and to place items in an electronic shopping cart. In other embodiments, any suitable app (software application) or other component may be used in place of the application.

In at least one embodiment, the application may include a browser extension (or plug-in) which performs certain functions, in accordance with the system and methods described herein. For example, as described in more detail below, in at least one embodiment, the browser extension may record requests made during interactions between the application and one or more of the plurality of e-commerce web servers 120A and 120B (and/or between the application and the server 115) and/or record user inputs on graphical user elements of GUIs. Alternatively, such operations may be performed by another component that need not be a part of the application. In at least one embodiment, the browser extension or another software application may run in the background regardless of whether the application is running (e.g., a background application). The background application may thereby see and record any relevant interactions with websites hosted by the e-commerce web servers 120A and 120B, regardless of which software is being used to perform the interactions.

In at least one embodiment, the browser extension may include an analysis tool. The analysis tool may be used to interpret and filter the recorded interactions or user inputs on graphical user elements associated with web pages hosted by the e-commerce web servers 120A and 120B. The analysis tool may run on another device, such as the server 115, or any other client device communicatively coupled to the server 115.

In at least one embodiment, the browser extension may also include a request identification program. The request identification program may review recorded requests or user inputs on graphical user elements associated with web pages, and identify those that are necessary to complete process flows. The request identification program may run on another device, such as the server 115 or any other client device communicatively coupled to the server 115.

In at least one embodiment, the browser extension may also include an automated site navigation program. The automated site navigation program may automatically extract information from various websites (such as those hosted by the e-commerce web servers 120A and 120B) without the need for rendering on a display, such as the display/UI 105A. The automated site navigation program may also automatically transmit requests to, receive responses from, and process the responses of the e-commerce web servers 120A and 120B, as discussed in more detail below. In at least one embodiment, the automated site navigation program may operate using information generated by the analysis tool and the request identification program, based on recorded interactions with web pages hosted by the e-commerce web servers 120A and 120B. In at least one embodiment, the automated site navigation program may function on the user device 105; alternatively, the automated site navigation program may be implemented on a separate device, such as the server 115. In at least one embodiment, the automated site navigation program operates without any need for human interaction.

The browser extension may also include a code testing and applying program. The code testing and applying program may, while a user is navigating an e-commerce website, test codes to determine whether any codes are valid codes which may be used with respect to a given composition or content of a shopping cart, or, generally, on any web page that includes a code input field. A shopping cart may be a server/browser hosted software-based mechanism to select goods (tangible or intangible) and/or services for eventual purchase/rental through an e-commerce website hosted by an e-commerce server. The shopping cart may include checkout queues, baskets, wish lists, etc. The composition of the shopping cart may be based on a current shopping cart of the user, or it may be based on a likely future shopping cart of the user (e.g., a user has viewed a type of product, a specific product, etc., and is likely to add the product to the shopping cart). Specifically, the browser extension may perform a code testing process, in accordance with the code testing and applying program, to determine valid codes for an e-commerce website.

In general, the browser extension may, to execute the code testing and applying program, monitor a browsing session of a user on an e-commerce website; determine whether a trigger condition is present based on the monitoring; when the determining determines the trigger condition is present, automatically perform a code test process for a first set of codes to obtain a first test result, the first set of codes being one or more codes among a plurality of codes for the e-commerce website; and upon completion of the code test process for the first set of codes, display a first menu, the first menu including information corresponding to the first test result.

In one aspect of the disclosure, the browser extension may determine whether a user is viewing an e-commerce website hosted by one of the plurality of e-commerce web servers 120A and 120B. For instance, the browser extension may, before the determining whether the trigger condition is present: determine whether the currently viewed e-commerce website is one of a plurality e-commerce websites, the plurality of e-commerce websites being approved to execute the code test process, as indicated by the e-commerce website information; when the determining determines the e-commerce website is one of the plurality of e-commerce websites, then determine whether the trigger condition is present; and when the determining determines the e-commerce website is not one of the plurality of e-commerce websites, only perform the code test process when the trigger condition is present and a user input authorizing the code test process to proceed is received. For instance, the browser extension may determine the user navigated to a website included in the e-commerce website information by, e.g., monitoring network requests sent by the user device 105 and/or analyzing a uniform resource locator (URL) of a currently accessed web page (e.g., displayed or loaded in a tab of a browser). The browser extension may determine the user is viewing the website by one or more of: determining the user has accessed a web page of a website included in the e-commerce website information; determining the user is viewing the accessed web page based on a currently displayed GUI; and/or determining the user device 105 has transmitted network requests and/or received user inputs on graphical user elements associated with the website. For instance, network requests and/or URLs may be searched for text strings that match one or more e-commerce websites (included in the e-commerce website information) hosted by the one or more e-commerce web servers 120A and 120B. As one example, the matching may be performed by regular expression processing on each network request and/or URL transmitted/accessed by the user device 105. The e-commerce website information may be obtained by the browser extension from the server 115. The server 115 may update the e-commerce website information periodically or in response to changes in the information of e-commerce website information. The server 115 may transmit the updates to the e-commerce website information to the user device 105 for the browser extension.

Generally, the plurality of e-commerce websites that are approved to execute the code test process may correspond to (1) e-commerce websites that have an average time to test a code below a code testing threshold time; (2) e-commerce websites that have a likelihood of a successful code above a threshold likelihood; and/or (3) e-commerce websites that have an average time to find a code that provides savings below a savings find threshold time. The testing threshold time may be, e.g., seven seconds, or some other time period, considering user experience. The threshold likelihood may be a set percent likelihood, such as one code in one hundred may be a successful code. The savings find threshold time may be, e.g., fifteen seconds, or some other time period, considering user experience. For instance, the average time to test a code for an e-commerce website may be determined by a historical analysis of previous attempts to test codes on the e-commerce website, from a start time to test a code to an end time to test a code. The likelihood of a successful code for an e-commerce website may be determined by the historical analysis of previous attempts to test codes indicating a rate of successful codes and/or length of time since a last successful code. The average time to find a code that provides savings for an e-commerce website may be determined by the historical analysis of previous attempts to test codes on the e-commerce website indicating a distribution of time to find a code that provides savings (or, generally, economic benefit). In one aspect of the disclosure, the server 115 may perform the historical analysis for all e-commerce websites that the code management program is able to operate in conjunction with, and determine the plurality of e-commerce websites with an average time to test a code below the code testing threshold time; a likelihood of a successful code above the threshold likelihood; and/or an average time to find a code that provides savings below the savings find threshold time.

To monitor a browsing session of a user on an e-commerce website, the browser extension may monitor network requests and replies, URLs, web pages, and/or user interactions on web pages. For instance, to monitor network requests and replies sent/received by the user device 105, the browser extension may (1) read sent requests and read received replies and/or (2) intercept and forward requests as a proxy between the application and the e-commerce server. To monitor URLs, the browser extension may extract a URL from network requests/replies and/or from a web page document of a currently viewed web page. To monitor web pages, the browser extension may obtain a web page document for a currently viewed web page. To monitor user interactions on a web page, the browser extension may read incoming messages to the application; and determine whether the incoming messages correspond to user inputs (e.g., mouse clicks, touch screen inputs, or text input, etc.) on one or more web pages elements of a currently viewed web page.

To determine whether the trigger condition is present based on the monitoring, the browser extension may obtain current web page information of the browsing session; analyze the current web page information to determine whether code input identifiers are present (e.g., where presence of code input identifiers is the trigger condition); and when the analyzing determines the code input identifiers are present, determine the trigger condition is present.

The current web page information may include a currently viewed web page of the browsing session, a universal resource locator (URL) of the currently viewed web page, and/or network requests/replies associated with the currently viewed web page. The currently viewed web page may be a web page that is currently displayed to the user or about to be displayed to the user (e.g., has been received and is being rendered for display to the user).

The code input identifiers may include one or more cascading style sheets (CSS) elements, one or more hypertext markup language (HTML) elements, and/or one or more URL elements. The one or more CSS elements may be CSS selectors that indicate a code input field. For instance, the CSS selectors may be determined by the server 115 or by analysis of web page documents. For instance, CSS selectors may be associated with text that indicates codes (e.g., promotional codes, coupon codes, etc.) (either in names, attributes, ids, classes, etc. of an HTML element or within element content of an HTML element); CSS selectors may be associated with text entry elements that are associated with the text that indicates codes (e.g., input fields or forms); and CSS selectors may be associated with buttons that are associated with the text entry elements and/or the text that indicates codes. The CSS selectors may be general to all of the e-commerce websites that are approved to execute the code test process, or specific to individual or groups of e-commerce websites that are approved to execute the code test process. The one or more HTML elements may be one or combinations of HTML elements associated with the text that indicates codes. For instance, the HTML elements may include: a text header (<h1>, <h2>, <h3>, <h4>, <h5>, <h6> tags); a paragraph (<p> tag); a horizontal ruler (<hr> tag); a link (<a> (anchor) tag); a list (<ul> (unordered list), <ol> (ordered list) and <li> (list element) tags); an image (<img> tag); a divider (<div> tag); a text span (<span> tag), or any other HTML element. For instance, an HTML element (e.g., a text header <h1> or paragraph <p>) may display "Shopping Cart" or "Promo Code?" on a web page. The one or more URL elements may be alphanumeric strings that indicate code entry fields are present on a corresponding web page or that codes have been applied, removed, or tested. For instance, the browser extension may use regular expression processing on URLs to match the alphanumeric strings to all or portions of a text string of the URL. As an example, an alphanumeric string may be "cart" in "example.com/cart." One of skill in the art would understand that the above examples are merely illustrative and not limiting. Moreover, the text that indicates code entry fields and the alphanumeric strings that indicates code entry fields may also include variations, synonyms, misspellings, etc. of text that indicates code entry fields and the alphanumeric strings that indicates code entry fields.

To analyze the current web page information to determine whether the code input identifiers are present may include: parsing the currently viewed web page to determine whether one of the one or more CSS elements and/or the one or more HTML elements are present; and parsing the URL of the currently viewed web page and/or the network requests to determine whether one of the one or more URL elements are present.

To determine whether one of the one or more CSS elements and/or the one or more HTML elements are present in the current web page information, the browser extension may obtain the web page document, parse the web page document, extract CSS elements and HTML elements from the parsed web page document; and determine whether any of the extracted CSS elements and/or the extracted HTML elements match one of the one or more CSS elements and/or the one or more HTML elements. For instance, the browser extension may extract a CSS element and determine whether a text string of the extracted CSS element matches a text string of the one or more CSS elements or determine whether the CSS element is within a same HTML element of text that indicates a code entry field. As an example, the web page document may include "<button class="promo-apply-button">Apply Code</button>" and the browser extension may match the button HTML element to one the one or more CSS elements because: (1) the button HTML element has a class of "promo-apply-button" and one or the one or more CSS elements has a class of "promo-apply-button" and/or (2) the button HTML element has text in the class (e.g., "promo") or the element content ("Apply", "Code", or "Apply Code") has text that indicates a code entry field (e.g., "promo," "apply," "code," "apply code").

To determine whether one of the one or more URL elements are present in the URL of the currently viewed web page and/or the network requests, the browser extension may use regular expression processing on the URL as a whole (or after removing non-relevant elements, e.g., "http") to determine whether the one or more URL elements are present. As an example, the URL of the web page may be "https://example.com/cart" and the browser extension may search for "cart" using regular expression processing on the URL to match the string "cart."

In response to determining the one or more CSS elements and/or the one or more HTML elements are present, the browser extension may determine that a trigger condition is present. In response to determining the one or more URL elements are present, the browser extension may determine that a trigger condition is present.

Alternatively or additionally, the browser extension may determine whether the trigger condition is present by executing a trigger machine learning model, such as an analytical model, a neural network, a reinforcement learning model, or, generally, a model that takes inputs (e.g., a feature set) and outputs a target (e.g., a score, a binary, etc.) based on a trained function. The function may be trained using a training set of labeled data, and/or the function may be updated iteratively (e.g., as in a reinforcement learning model). The feature set may be based on the web page document of the currently viewed web page and/or the URL of the currently viewed web page. The output may indicate whether the web page includes code input fields, e.g., by a score above a threshold score or if the binary returns web page includes a code input field.

If the trigger condition is not present, the browser extension may continue to monitor the browsing session of the user on the e-commerce website and determine whether the trigger condition is present based on further network requests, web pages viewed, etc., until the user navigates away from the e-commerce website. If the trigger condition is present, the browser extension may proceed to automatically perform the code test process for the first set of codes to obtain the first test result.

As mentioned above, the first set of codes may be one or more codes among a plurality of codes for the e-commerce website. The plurality of codes may be associated with the e-commerce website. For instance, the code information may be obtained by the browser extension from the server 115. The code information may include codes from a third party (e.g., a service that aggregates codes for e-commerce websites), codes scraped from the internet, codes that have been successfully used by users of the browser extension and/or the server 115 (e.g., crowd sourced codes), and/or personal codes of the user. The server 115 may collect the codes and provide the code information to the browser extension. For instance, the server 115 and/or the browser extension may access a user's e-mail account, find e-mails from e-commerce websites that include personal codes (e.g., single-use codes, special codes, codes only usable by the user, etc.), extract the personal codes from the e-mails from e-commerce websites, and (by the browser extension) use the personal codes in the code testing process.

To obtain the first set of codes, the browser extension may obtain the plurality of codes for the e-commerce website; and select the one or more codes from the plurality of codes as the first set of codes. Alternatively, the server 115 may provide the code information with the first set of codes and second set of codes corresponding to a remainder of the plurality of codes not included in the first set of codes.

In either case, the plurality of codes are scored according to a scoring algorithm (or ranked according to the scores, by a power ranking algorithm). The scoring algorithm/power ranking algorithm may score the plurality of codes according to a scoring/ranking model. The server 115 may score the plurality of codes using the scoring algorithm/power ranking algorithm, and include the scores in the code information in association with the plurality of codes. The scoring/ranking model may score the plurality of codes based on code data. The code data may include one or a combination of: (1) likelihood of success for a code for the e-commerce website; (2) a savings amount (or other economic benefit) for a code; (3) a last time a code was successfully used or applied; (4) popularity of a code across e-commerce websites (e.g., common promotional codes used on e-commerce websites); (5) a number of sources for a code; and/or (6) a number of uses of a code in the past by users manually entering the code.

The likelihood of success for the code for the e-commerce website may be a success rate (e.g., one of three times applied the code was successful), based on a historical analysis of applying the code on the e-commerce website. The savings amount (or other economic benefit) for the code may be an average amount saved (e.g., a dollar amount) or an average percentage discount, based on the historical analysis of applying the code on the e-commerce website.

The last time the code was successfully used or applied may be a date and time, based on the historical analysis of applying the code on the e-commerce website. The popularity of the code across e-commerce websites may be determined based on statistical analysis of codes for all e-commerce websites. The number of sources for the code may be determined by tracking a number of entities that indicate the code for the e-commerce website. For instance, the number of entities may be counted based on a number of third parties that provide the code, a number of websites the code is scraped from, a number of user's emails that indicate the code, etc. The number of uses of the code in the past by users manually entering the code may be determined by tracking codes entered manually by users.

Alternatively, the scoring/ranking model may be a scoring/ranking machine learning model, such as an analytical model, a neural network, a reinforcement learning model, or, generally, a model that takes inputs (e.g., a feature set) and outputs a target (e.g., a score) based on a trained function. The function may be trained using a training set of labeled data, and/or the function may be updated iteratively (e.g., as in a reinforcement learning model). The feature set may be based on the code data. The output may indicate a score for the code, indicating a potential of the code (e.g., likely to be successful/savings/etc.).

To select the one or more codes from the plurality of codes as the first set of codes, the browser extension (or the server 115) may select a number of codes scored highest of the scored plurality of codes as the one or more codes. The number of codes may be set to a fixed number or may be set to a variable based on average processing time to test codes on an e-commerce website. For instance, the fixed number may be a same number (e.g., two) for all users, or the fixed number may be different for different users (e.g., 90% of users have a fixed number of two, and 10% have a fixed number of five). The variable may be determined (by the browser extension or the server 115) by dividing a total time by an average time to process a code on an e-commerce website. The server 115 may provide the threshold time, the variable, and/or the average time to process the code in the code information for the e-commerce website. The threshold time may be set to a fixed time, periodically adjusted, or dynamically adjusted, considering user experience.

In another aspect of the disclosure, the browser extension (or the server 115) may adjust the ranking of the codes (or the scores of the codes) based on a classification of a code. The classification of the code may indicate whether the code is applicable to particular brands, products, services, etc. The browser extension may parse the web page document, extract HTML elements, and perform a natural language process to determine a product/brand/service(s) of the web page document, or the browser extension may determine a product/brand/service(s) from the shopping cart of the browsing session. The browser extension may transmit the determined product/brand/service(s) to the server 115, and the server 115 may determine adjustment(s) to the ranking/scores of the plurality of codes. For instance, the server 115 may receive the determined product/brand/service(s) and determine whether there is a match to a classification of a code of the plurality of codes. If there are any matches to the classifications of the codes, the server 115 may determine the adjustment(s) for the corresponding codes in the ranking/scoring, such as moving a code up the ranking a predetermined number of ranks or adding (or scaling) a score of the code by a predetermined amount.

To perform the code test process for the first set of codes, the browser extension may automatically apply, sequentially or in parallel, codes of the first set of codes to the browsing session of the user; receive, for each applied code of the applied codes, responses from the e-commerce website; analyze the responses to determine a result for each of the applied codes; and compile the first test result based on the determined result for each of the applied codes.

To apply a code to the browsing session of the user, the browser extension may select an untested code and perform one of: (1) transmitting to the e-commerce website a request to apply the code to a shopping cart of the browsing session or transmitting a request to apply the code as if entered in a code input field; or (2) programmatically entering a text string corresponding to the code into a code input field and programmatically selecting an input button to cause the web page to transmit the request. To transmit the request, the browser extension may generate the request in accordance with information from the request identification program or the analysis tool and/or from the e-commerce website information. For instance, the request may be specifically formatted in accordance with an API call of a cart API of the e-commerce website or may be a specifically formatted HTTP request. The browser extension may then transmit the generated request to the e-commerce web server 120A or 120B associated with the e-commerce website. To select the untested code, the browser extension may randomly select an untested code from among untested codes of a set of codes; select an untested code with a highest score from among the untested codes; select an untested code associated with an e-mail of the user, etc.

To analyze the responses to determine a result for each of the applied codes, the browser extension may parse marked up data and/or formatted data of the response, in accordance with information from the request identification program or the analysis tool and/or from the e-commerce website information. For instance, the response may be specifically formatted in accordance with an API response of the cart API, the response may be text in HTML/CSS format, or the response may be in a data structure, such as JSON. In any of these cases, the response may be parsed according to the information from the request identification program or the analysis tool and/or from the e-commerce website information. The browser extension may then extract transaction data from the parsed marked up data and/or formatted data of the response, and determine transaction results based on the extracted transaction data. To extract transaction data, the browser extension may find and extract phrases of text and/or elements of the parsed marked up data and/or formatted data, based on predetermined structures of the marked up data and/or formatted data.

For instance, the information from the request identification program or the analysis tool and/or from the e-commerce website information may indicate that an HTML/CSS response may include a section in a body in a table format with an indicator confirming successful code application, previous cost, current cost, taxes (if any), shipping, warranties, availability, expected shipping/arrival date, etc. (transaction details). Likewise, an API response may include a formatted data structure that indicates the same types of transaction details.

To determine the transaction results based on the extracted transaction data, the browser extension may compare a prior state to a current state of the shopping cart (e.g., before and after the code was applied to the shopping cart) or compare a prior state to a current state of the code input field of the web page. The browser extension may compare the prior state to the current state by comparing the transaction details, and determining if there are any differences between the transactions details. As an example, the prior state may have a higher cost than the current state, if the code applies a discount coupon to the shopping cart or to the item. In this manner, the browser extension may determine whether the code effects any change to the state of the shopping cart or to the item. Generally, the code may be considered a valid code if the code causes a change to the state of the shopping cart; however, the browser extension may also only consider codes that benefit the user in one or more ways as valid codes. Based on the comparison, the browser extension may generate the transaction results to indicate whether the code is a valid code. Furthermore, when the transaction results indicate that the code is the valid code, the browser extension may include in the transaction results further information regarding discounts, shipping information, and/or other transaction details.

To compile the first test result based on the determined result for each of the applied codes, the browser extension may associate the transaction results and the transaction details with each of the codes that were applied. For instance, the browser extension may determine a first code is valid and causes a discount, a second code is invalid, and so on for each of the codes included in the first set of codes; and store each code in association with the transaction results and the transaction details.

Additionally or alternatively, the browser extension may transmit a request to delete the code from the shopping cart or the code input field. For instance, this may make testing a next code easier (e.g., faster) or may reduce a likelihood of accidently holding a reserved use of the code from interfering with the user's ability to use the code when checking out.

To display the first menu, the browser extension may obtain the compiled first test result, extract the transaction results and the transaction details for the codes that were applied from the first test result, generate the first menu based on the transaction results and the transaction details for the codes that were applied, and display the first menu. Generally, the first menu may include: when the first test result indicates one or more successful codes of the first set of codes, a success indicator, the success indicator displaying a summary of savings or reward points for the one or more successful codes; when the first test result indicates no successful codes of the first set of codes, a no-savings indicator; and when the first set of codes does not include all of the plurality of codes, a continue testing indicator to test the second set of codes.

For instance, the success indicator may be a text string summary of an amount of savings (e.g., a dollar amount or percentage) (or other economic benefit) that a successful code provides. The browser extension may select the successful code for the success indicator from among the valid codes of the transaction results. For instance, the browser extension may perform a selection algorithm to select the successful code. The selection algorithm may select a valid code that is a personal valid code associated with the user, a valid code that has a greatest savings, a valid code with a fastest estimated shipping, etc., or a combination thereof of benefits for the user. The success indicator may be (or may be associated with) a link or button selectable by a user input to proceed to apply the selected code (or activate a reward, as discussed below with respect to FIGS. 4A-4D and 5A-5C) and, optionally, proceed in a checkout process. The browser extension may automatically apply the selected code to the shopping cart. Moreover, in the case that a code was already applied to a shopping cart (e.g., by a user) before the code test process started, the browser extension may (before executing the code test process): store the previously applied code and a difference in a prior state to a current state of the shopping cart for the previously applied code (e.g., store a savings amount of the previously applied code); and remove the previously applied code. The browser extension may (after the code test process): determine whether the difference in the prior state to the current state of the shopping cart for the previously applied code offers a greater economic benefit than any of the valid codes (e.g., greater savings, faster estimated shipping, etc., or a combination thereof of benefits for the user); in response to determining the difference in the prior state to the current state of the shopping cart for the previously applied code offers the greater economic benefit than any of the valid codes, applying the previously applied code instead of a valid code; and in response to determining the difference in the prior state to the current state of the shopping cart for the previously applied code does not offer the greater economic benefit than any of the valid codes, automatically apply the selected code to the shopping cart.

The continue testing indicator may be a text string indicating that more codes are available for testing (e.g., the second set of codes) and/or a number of the codes available for testing (e.g., a number of codes of the second set of codes). The continue testing indicator may be (or may be associated with) a link or button selectable by a user input to proceed to test the second set of codes.

The no-savings indicator may be a text string indicating that no codes returned savings (or economic benefit). The no-savings indicator may be (or may be associated with) a link or button selectable by a user input to exit the first menu (called herein an "exit action"). The exit action may close all menus associated with the browser extension.

In another aspect of the disclosure, the browser extension, may, when a continue testing indicator to test the second set of codes is displayed in the first menu, receive a user input to test the second set of codes. In response to receiving the user input to test the second set of codes, the browser extension may perform the code test process for the second set of codes to obtain a second test result. Upon completion of the code test process for the second set of codes, the browser extension may display a second menu, the second menu including information corresponding to the second test result. The code test process for the second set of codes may be the same as or similar to the code test process for the first set of codes (except for the codes being tested). The second menu may be generated and displayed in a same or similar manner as the first menu.

In another aspect of the disclosure, as optional additional features, while the code test process is executing (for either or both the first set of codes or the second set of codes), the browser extension may (1) display no indication of a code testing process or (2) display a progress menu before displaying a result menu. The progress menu may include a code testing indicator (such as testing indicator 416B depicted in FIG. 4B) that indicates that code testing is currently proceeding, so that a user is aware the code testing is proceeding. The progress menu may also graphically or textually indicate a progress amount (such as progress bar 416C depicted in FIG. 4B) of the code testing. For instance, the progress amount may be a percentage of a number of codes tested of all of the codes to be tested (e.g., 1 of 5 codes of the first set of codes have been tested would be 20% tested, and so on).

In another aspect of the disclosure, to perform the code test process, the browser extension may clone a user's shopping cart to form a cloned shopping cart in a shadow session using the present content. For instance, the browser extension may clone the user's shopping cart to form the cloned shopping cart in the shadow session using a present content of the user's shopping cart. The browser extension may then test the codes on the cloned shopping cart in the shadow session to determine the valid codes. A shadow session may be a session distinct and separate from the session associated with the user, between the browser extension and the e-commerce web server 120A or 120B that hosts the e-commerce website. The shadow session may be processed in a background of the application such that a user may not see associated web pages, graphics, or information. The browser extension may invoke the automated site navigation program to perform the process to test the codes on the cloned shopping cart in the shadow session. To clone the user's shopping cart as a cloned shopping cart, the browser extension may add, delete, or modify items of another shopping cart in the shadow session so that the another shopping cart (e.g., the cloned shopping cart) corresponds to the present content of the users shopping cart. To test the codes on the cloned shopping cart in the shadow session, the browser extension (or the automated site navigation program in accordance with instructions from the browser extension) may perform the code test process on the cloned shopping cart in the shadow session.

In another aspect of the disclosure, to determine whether the trigger condition is present based on the monitoring, the browser extension may determine whether the currently viewed e-commerce website is one of the plurality e-commerce websites and/or determine whether a currently viewed webpage (e.g., a webpage for a product) of the currently viewed website is one of a plurality of webpages. As discussed above, the plurality of e-commerce websites may be approved to execute the code test process for websites known to almost always have a code available and have some known success (e.g., the e-commerce websites that have a likelihood of a successful code above a threshold likelihood). The plurality of webpages may correspond to products that have a likelihood of having a code that works above a threshold, in a similar manner as discussed above for the plurality of e-commerce websites. Then, the browser extension may perform the code test process for the first set of codes, as discussed above, without determining whether code input identifiers are present. Then, upon completion of the code test process, the browser extension may display the result menu. Therefore, in this aspect of the disclosure, the trigger condition may not necessarily only be a presence of code input identifiers, but that the website enables code input and has a likelihood of success above a threshold. Thus, the browser extension may present (e.g., display the result menu) successes to a user as they are browsing and not yet on a cart page (or on another webpage without code input identifiers). Additionally, for one of the plurality e-commerce websites and/or the one or more webpages, before executing the code test process, the browser extension may wait to execute the code test process until a specific duration of time has passed while viewing the website and/or the webpage; if the specific duration of time has not passed, the browser extension may not execute the code test process (therefore, reducing processing time/effort and reducing likelihood of conflicting network messages); if the specific duration of time has passed, the browser extension may execute the code test process (therefore, only using processing time/effort for websites/webpages that a user has shown interest in).

Therefore, the methods and systems of the present disclosure may effectively remove an engagement step in the savings conversion funnel for users of the system of the present disclosure, by automatically (based on a trigger condition being present) testing codes of the first set of codes, and displaying a menu based on results of the code testing. The removal of an engagement step in the savings conversion funnel for users of the system of the present disclosure may cause a marked increase in coupon savings for users of the system of the present disclosure. Further, the system of the present disclosure may avoid unduly delaying users while the users browse or check out, by selecting the first set of codes so that the code test process for the first set of codes is within a threshold period of time. Moreover, the first set of codes may be selected based on a high potential of savings (or other economic benefit) being found, so that a user may be informed automatically that a specific savings is available.

Figure 2:
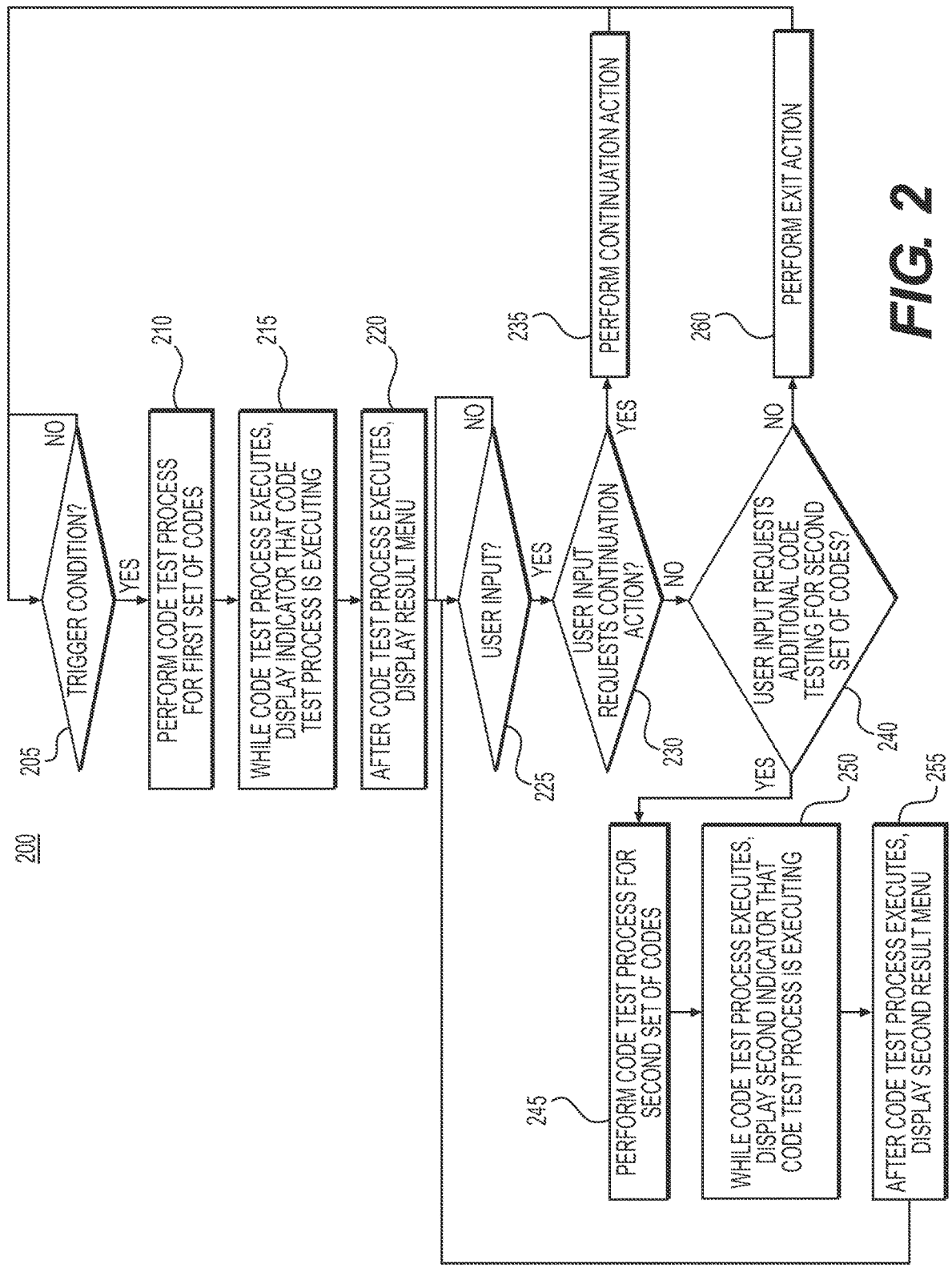
FIG. 2 depicts a flowchart for automatically testing and applying codes, according to one or more embodiments.

FIG. 2 depicts a flowchart for automatically testing and applying codes, according to one or more embodiments. The flowchart 200 may be performed by the user device 105, discussed above, by executing the automatic code test process of the browser extension of the application. The browser extension may start the process of the flowchart 200 by determining whether a trigger condition is present (block 205). For instance, the browser extension may determine whether the trigger condition is present by monitoring a browsing session of the user and determining whether one of the CSS elements, HTML elements, or URL elements are present, as discussed above with respect to FIG. 1.

In response to determining that the trigger condition is not present (block 205: No), the browser extension may proceed to wait until the trigger condition is present (block 205). In response to determining that the trigger condition is present (block 205: Yes), the browser extension may proceed to perform a code test process for a first set of codes (block 210). For instance, the browser extension may perform the code test process in accordance with FIG. 3, described below.

The browser extension may then proceed to, while the code test process for the first set of codes executes, display an indicator that the code test process is executing (block 215). For instance, the browser extension may display a progress menu to inform the user that a code test process is executing, as discussed above with respect to FIG. 1.

The browser extension may then proceed to, after the code test process for the first set of codes is completed, display a result menu (block 220). For instance, the browser extension may generate the result menu based on the transaction results and the transaction details for the codes that were applied and display the result menu, as discussed above with respect to FIG. 1.

The browser extension may then proceed to determine whether a user input is received (block 225). In response to determining that the user input is not received (block 225: No), the browser extension may proceed to wait until the user input is received (block 225). In response to determining that the user input is received (block 225: Yes), the browser extension may proceed to determine whether the user input requests a continuation action (block 230).

In response to determining that the user input requests the continuation action (block 230: Yes), the browser extension may proceed to perform the continuation action (block 235). For instance, the browser extension may activate a rewards offer for the e-commerce website or apply a corresponding code to a user's shopping cart, as discussed above with respect to FIG. 1. The browser extension may then proceed to determine whether the trigger condition is present (block 205).

In response to determining that the user input does not request the continuation action (block 230: No), the browser extension may proceed to determine whether the user input requests additional code testing for a second set of codes (block 240). For instance, the browser extension may determine whether the user input requests additional code testing for the second set of codes only if the first result menu includes a continue testing indicator. The browser extension may determine the user input requests the additional code testing if the user input engages on a button or link associated with the continue testing indicator, as discussed above with respect to FIG. 1.

In response to determining that the user input requests additional code testing for the second set of codes (block 240: Yes), the browser extension may proceed to perform a code test process for a second set of codes (block 245). For instance, the browser extension may perform the code test process in accordance with FIG. 3, described below.

The browser extension may then proceed to, while the code test process for the second set of codes executes, display an indicator that the code test process is executing (block 250). For instance, the browser extension may display a second progress menu, as discussed above with respect to FIG. 1.

The browser extension may then proceed to, after the code test process for the second set of codes is completed, display a result menu (block 255). For instance, the browser extension may display the second result menu, as discussed above with respect to FIG. 1. The browser extension may then proceed to determine whether a user input is received (block 225).

In response to determining that the user input does not request additional code testing for the second set of codes (block 240: No), the browser extension may proceed to perform an exit action (block 260). For instance, the browser extension may close all menus associated with the browser extension, as discussed above with respect to FIG. 1. The browser extension may then proceed to determine whether the trigger condition is present (block 205).

Figure 3:
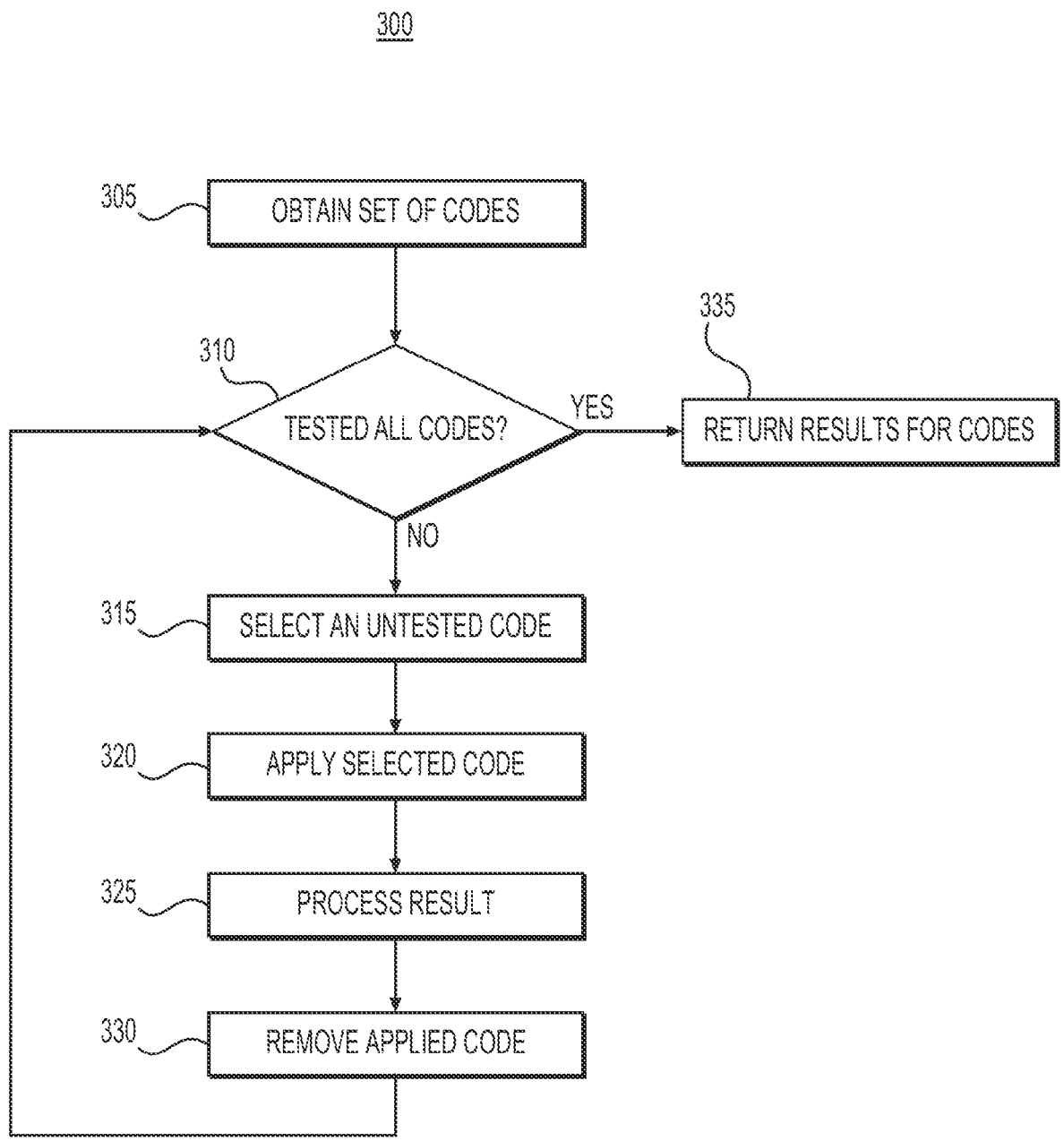
FIG. 3 depicts a flowchart for automatically testing and applying codes, according to one or more embodiments.

FIG. 3 depicts a flowchart for automatically testing and applying codes, according to one or more embodiments. The flowchart 300 may be performed by the browser extension, discussed above, to perform the code testing process on the shopping cart (e.g., block 210 or block 245 of FIG. 2). The browser extension may start the process of the flowchart 300 by obtaining a set of codes to be tested (block 305). The browser extension may then proceed to determine whether all codes of the set of codes have been tested (block 310).

In response to determining that all codes of the set of codes have been tested (block 310: Yes), the browser extension may proceed to return the results of the code testing process (block 335).

In response to determining that all codes of the set of codes have not been tested (block 310: No), the browser extension may proceed to select an untested code from among untested codes of the set of codes (block 315). For instance, the browser extension may, e.g., select an untested code with a highest score, etc., as discussed above with respect to FIG. 1.

The browser extension may then proceed to apply the selected code (block 320). For instance, the browser extension may programmatically enter a text string corresponding to the code in a code entry field and programmatically engage a button/input/form of the code entry field, as discussed above with respect to FIG. 1. The browser extension may then proceed to process a received result from the e-commerce website (block 325). For instance, the browser extension may process a response by parsing the response to extract transaction results and transaction details, as discussed above with respect to FIG. 1.

The browser extension may then proceed to remove the applied code (block 330). For instance, the browser extension may transmit a request to delete the selected code, as discussed above with respect to FIG. 1. The browser extension may then proceed to determine whether all codes of the set of codes have been tested (block 310).

In this manner, each code of the codes of the set of codes may be tested. One skilled in the art may recognize that the flowchart 300 may be performed in parallel for each code of the set of codes or in various different modes and sequences based on resources and network constraints. For instance, the code test process may be performed by distributed computing by having the server 115 and/or other user devices perform the code test process on a cloned shopping cart using duplicated cloned shopping carts and shadow sessions so as test multiple codes at a same time. Alternatively, the user device 105 may generate multiple shadow sessions and cloned shopping carts so as test multiple codes at a same time.

Figure 4A:
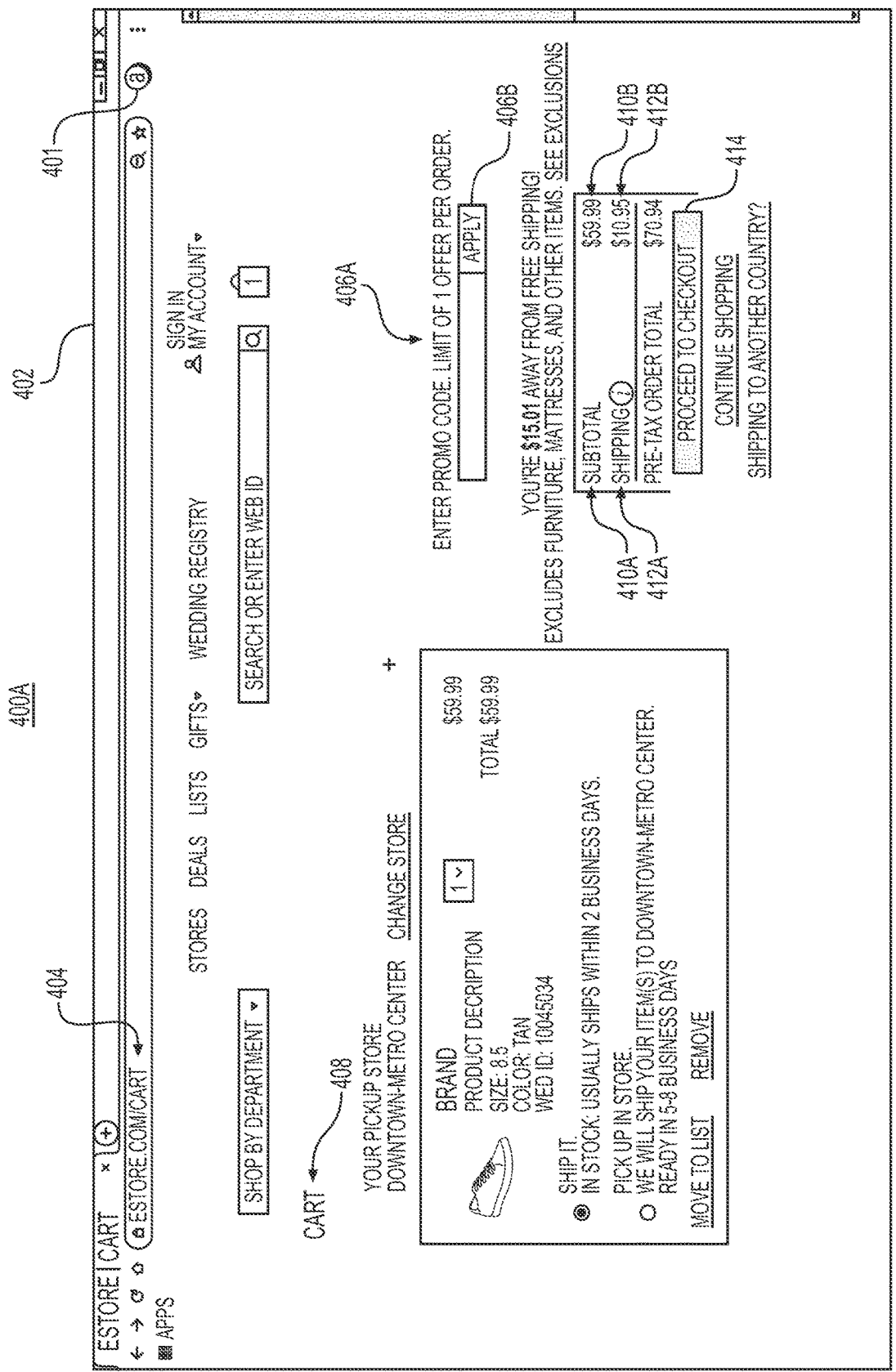

FIGS. 4A-4H depict graphical user interfaces (GUIs) for automatically testing and applying codes, according to one or more embodiments. In FIG. 4A, GUI 400A may depict a web page 402 of an e-commerce website hosted by one of the plurality of e-commerce web servers 120A and 120B, within a browser program that has a browser extension 401, such as the browser extension discussed above. The e-commerce web page 402 may be identified by a uniform resource locator (URL) 404.

The e-commerce web page 402 may display various HTML elements, such as shopping cart text 408, code text 406A and code text entry box and/or button 406B, pricing text 410A and pricing data 410B, shipping text 412A and shipping data 412B, and/or a checkout button 414. The browser extension may determine whether a trigger condition is present based on the URL 404 and the various HTML elements of the e-commerce web page, as discussed above with respect to FIG. 1. In the case depicted in FIG. 4A, the browser extension may determine a trigger condition is present based on one or a combination of: (1) the URL 404 having "cart" matching a URL element; (2) the code text 406A having "promo code" in element content of the code text 406A match an HTML element; and/or (3) a CSS element of the e-commerce page (not depicted) matching a CSS element. When the determining determines the trigger condition is present, the browser extension may automatically perform a code test process for a first set of codes for an e-commerce website corresponding to the e-commerce web page 402.

Figure 4B:
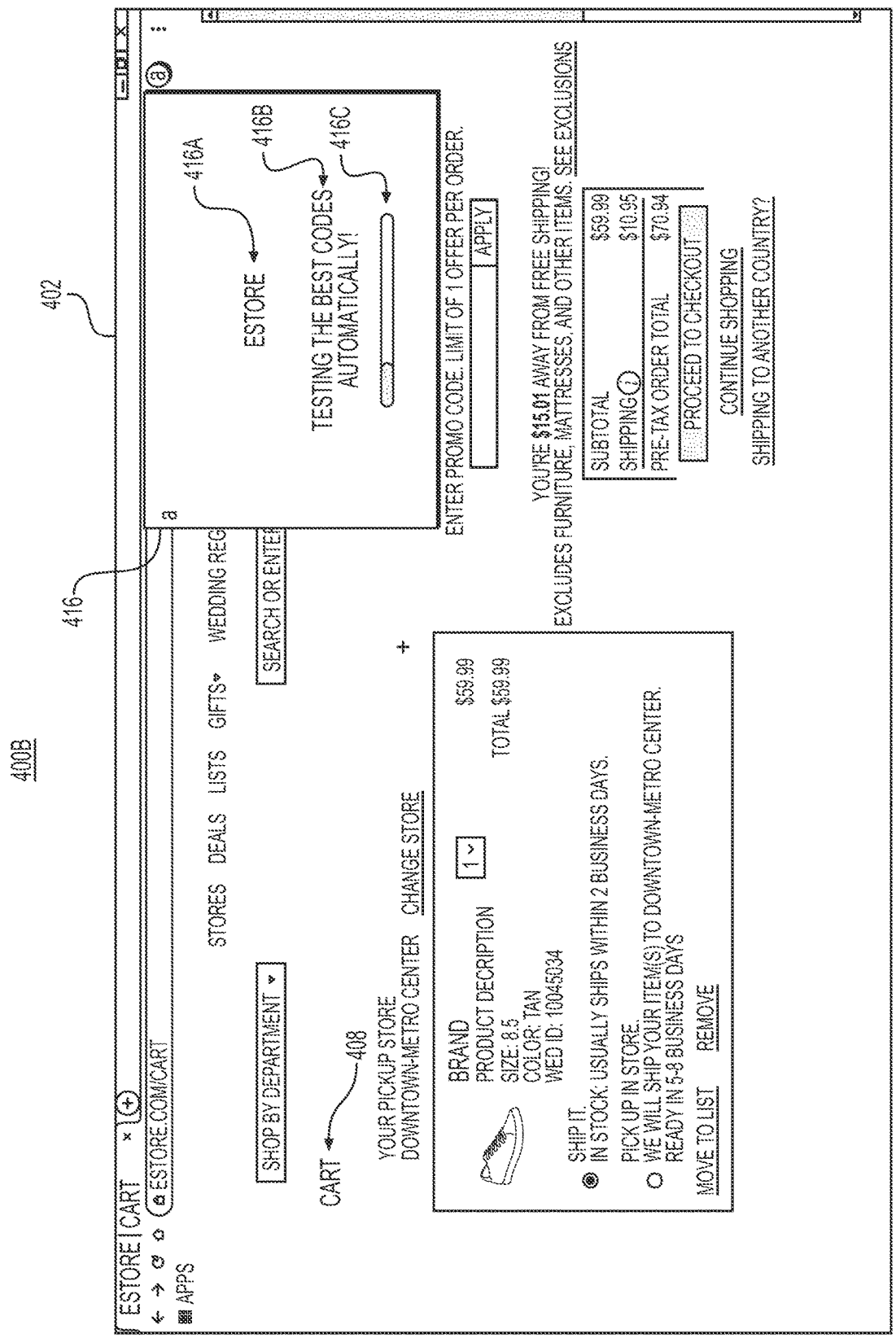

For instance, in FIG. 4B, while the code test process is executing, the browser extension may depict a GUI 400B (similar to or the same as GUI 400A) and a progress menu 416 overlaid on top of the GUI 400B. The progress menu 416 may include an e-commerce website indicator 416A, a test indicator 416B, and/or a test progress bar 416C. The e-commerce website indicator 416A may be a graphic or text corresponding to the e-commerce web page 402. The test indicator 416B may be a text string indicating that a code test process is executing, as discussed above with respect to FIG. 1. The test progress bar 416C may depict a progress of the code test process, as discussed above with respect to FIG. 1.

After the first code test process is completed, the browser extension may replace the progress menu 416 (or update the progress menu 416) with a result menu of the first code test process. For instance, the browser extension may obtain a compiled first test result; extract the transaction results and the transaction details for the codes that were applied from the first test result; generate the result menu based on the transaction results and the transaction details for the codes that were applied; and display the result menu.

Figure 4C:
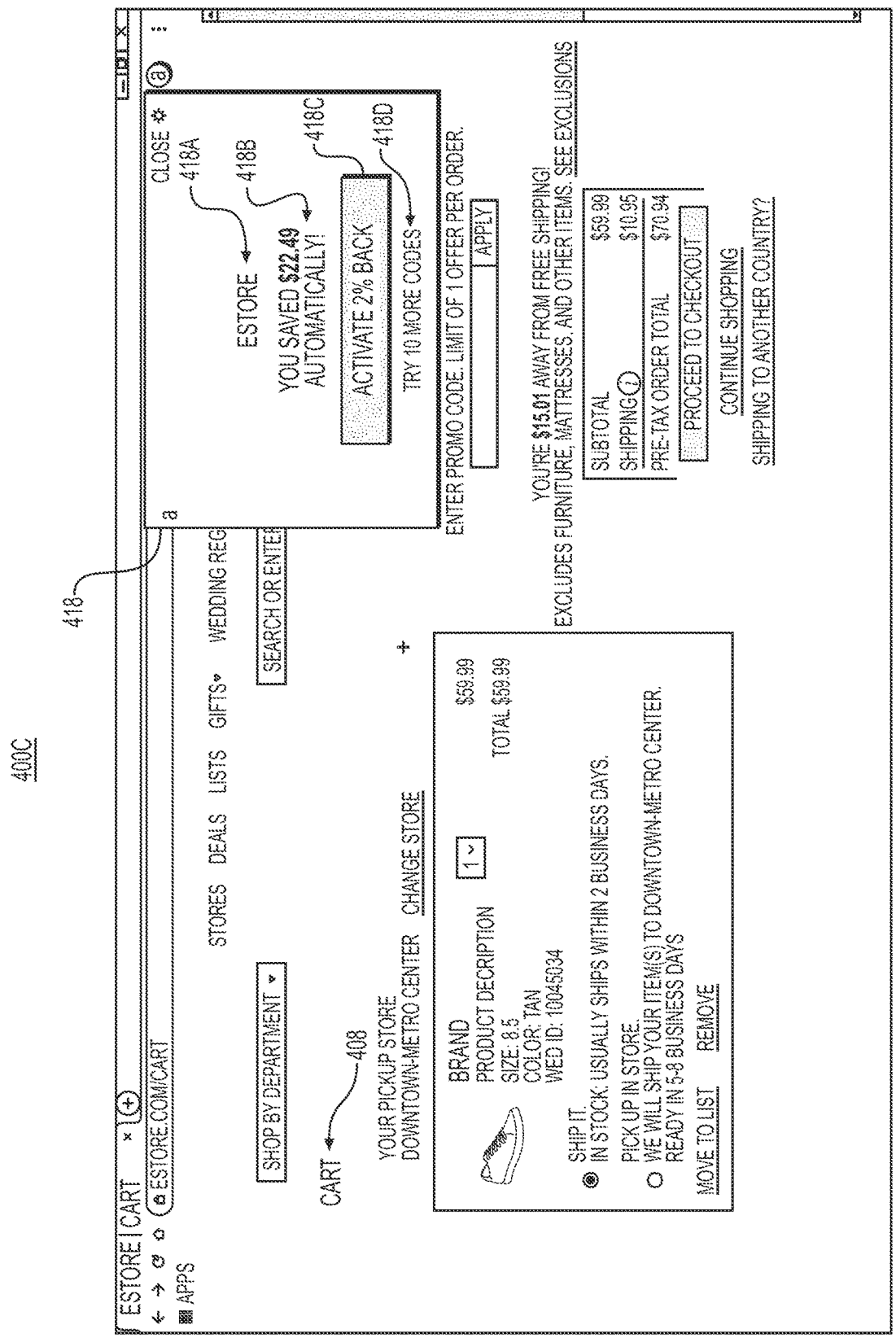

For instance, as depicted in GUI 400C of FIG. 4C, the browser extension may display a first result menu 418. The first result menu 418 may include an e-commerce website indicator 418A, a test summary indicator 418B, and/or one or more action buttons, such as a continuation action button 418C and/or a test more codes button 418D. The e-commerce website indicator 418A may be the same as the e-commerce website indicator 416A. The test summary indicator 418B may be a text string that indicates a potential or already applied savings (or other economic benefit) for a valid code. The continuation action button 418C may be selectable by user input to apply a code (if not already applied), to proceed to check out (if a code is already applied), and/or to activate a rewards offer (if not already applied). The test more codes button 418D may be selectable by a user input to test a second set of codes.

Generally, the browser extension may display the result menu with a variety of different information and/or buttons to the user based on results of the first code test process. For instance, the browser extension may display one of the first result menu 418, a second result menu 420, a third result menu 422, a fourth result menu 424, a fifth result menu 426, and/or a sixth result menu 428. One of skill in the art would recognize the browser extension would generate the result menu based on the results of the first code test process.

As depicted in FIGS. 4D-4H, the second result menu 420, the third result menu 422, the fourth result menu 424, the fifth result menu 426, and the sixth result menu 428 may include an e-commerce website indicators (420A, 422A, 424A, 426A, 428A), a test summary indicators (420B, 422B, 424B, 426B, 428B), and/or one or more action buttons (420C/420D, 422C/422D, 424C, 426C, 428C). The e-commerce website indicators may be the same as the e-commerce website indicator 416A. The test summary indicators may be a text string that indicates a potential or already applied savings (or other economic benefit) for a valid code (e.g., 420B for potential rewards, 422B for potential savings, 426B for potential rewards and additional codes to test); no potential savings but additional codes to test (see, e.g., 424B); no potential savings and no additional codes to test (see, e.g., 428B). The continuation action buttons may be selectable by user input to apply a code (if not already applied), to proceed to check out (if a code is already applied), to activate a rewards offer (if not already applied), and/or to exit (see, e.g., 428C).

Figure 5A:
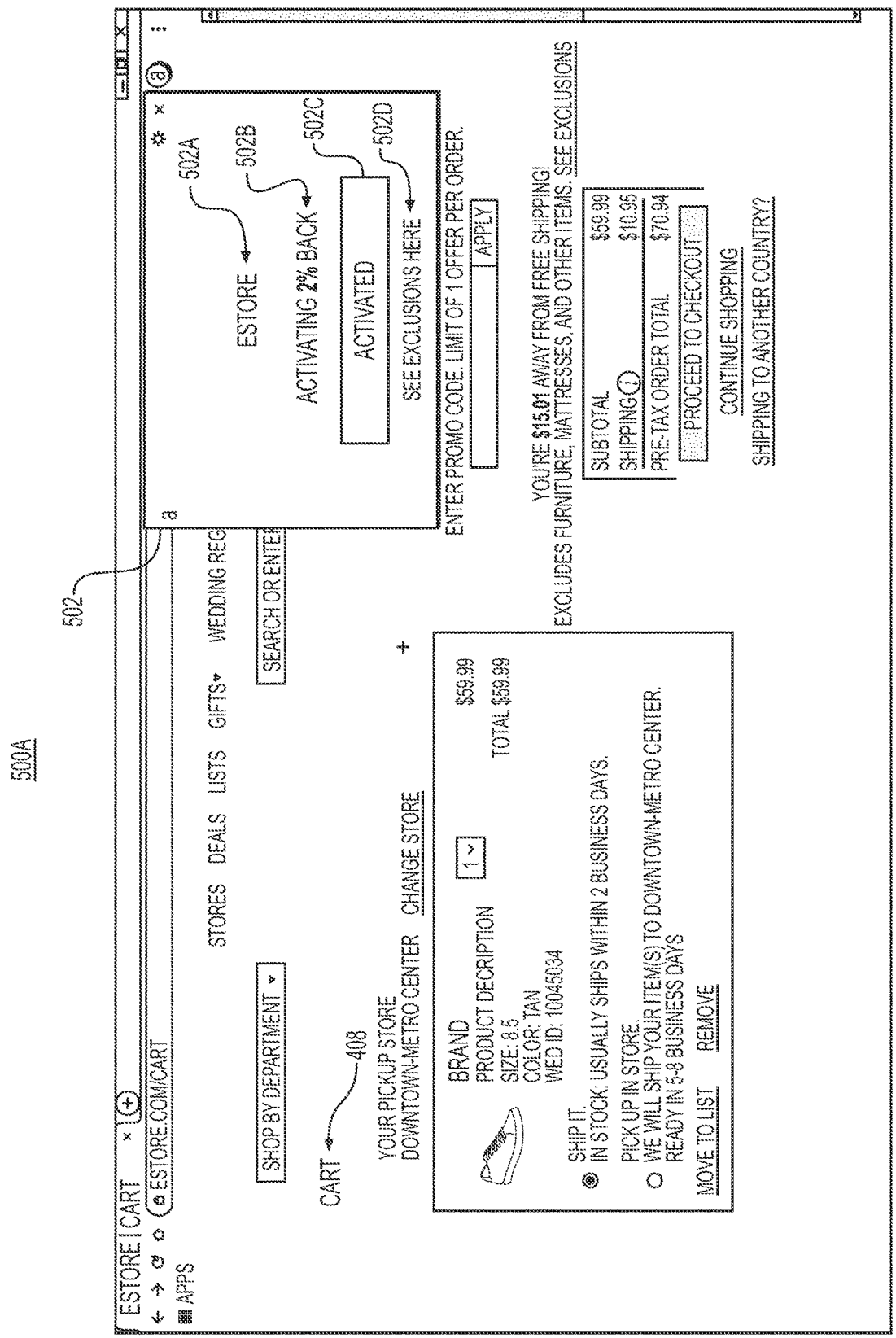
FIGS. 5A-5D depict GUIs for automatically testing and applying codes, according to one or more embodiments.

FIGS. 5A-5O depict GUIs for automatically testing and applying codes, according to one or more embodiments. In FIG. 5A, GUI 500A may depict a continuation menu 502, in response to a user input on a button to perform a continuation action (e.g., activate rewards or proceed to checkout with savings). The browser extension may replace the result menu (e.g., the first result menu 418)(or update the result menu) with the continuation menu 502. The continuation menu 502 may include an e-commerce website indicator 502A, an activating indicator 502B, an activated button 502O, and/or a link 502D. The e-commerce website indicator 502A may be the same as the e-commerce website indicator 416A. The activating indicator 502B may be a text string that indicates an activation process (depicted) or code application process is processing. The activated button 502C may previously have been selected by a user input, and may display in changed state (e.g., change of color) to indicate that it was selected by the user input and/or is no longer selectable. The link 502D may redirect (or display in a menu) to a web page in association with the reward offer being activated (depicted, as exclusions to the reward offer) or a code being applied.

Figure 5B:
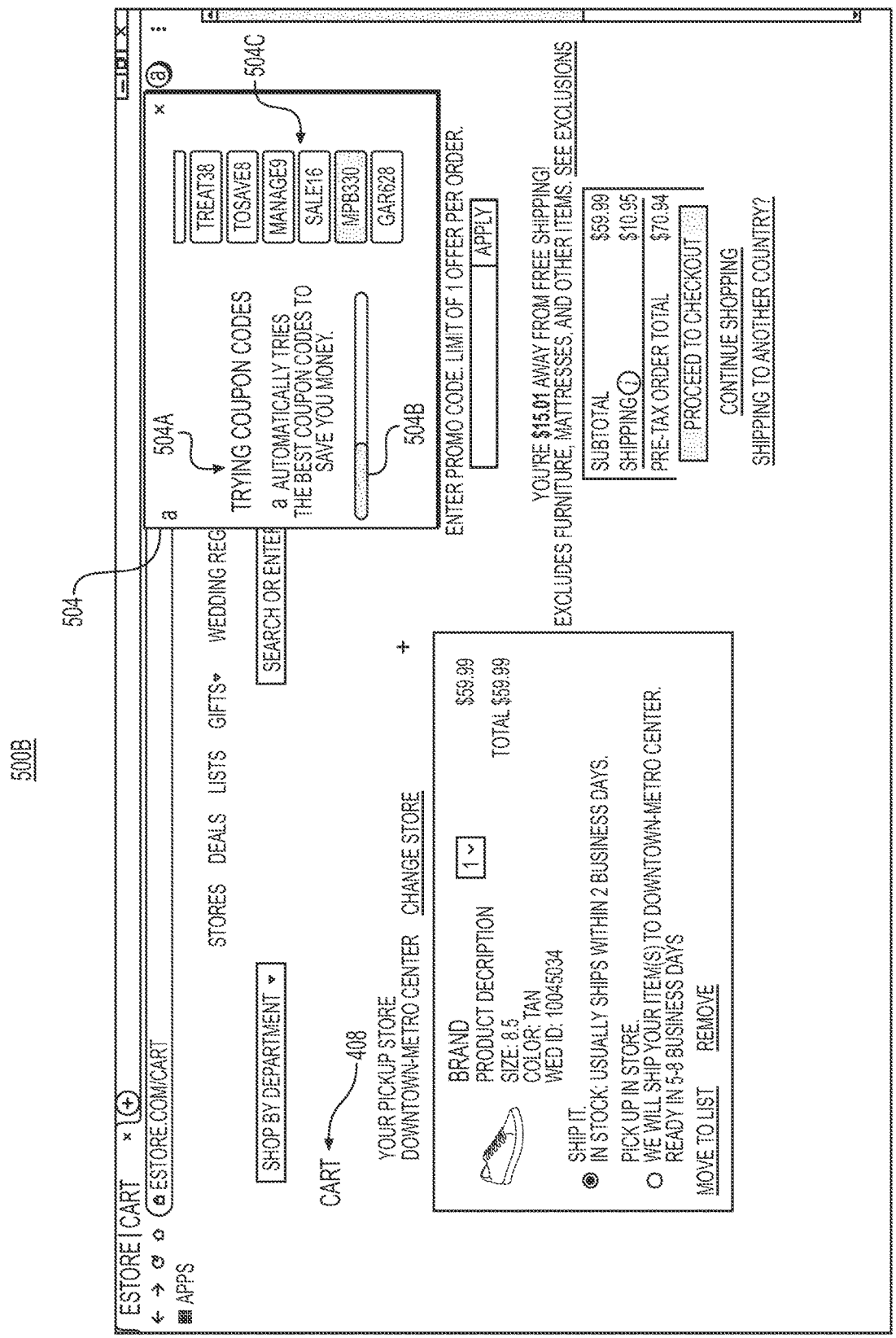

In FIG. 5B, GUI 500B may depict a second progress menu 504, in response to a user input to perform a second code test process. The browser extension may replace the result menu (e.g., the first result menu 418)(or update the result menu) with the second progress menu 504. The second progress menu 504 may include a test indicator 504A, a test progress bar 504B, and/or a graphic 504C. The test indicator 504A may be a text string indicating that a code test process is executing, as discussed above with respect to FIG. 1. The test progress bar 504B may depict a progress of the code test process, as discussed above with respect to FIG. 1. The graphic 504C may depict some or all of the codes being tested.

Figure 5C:
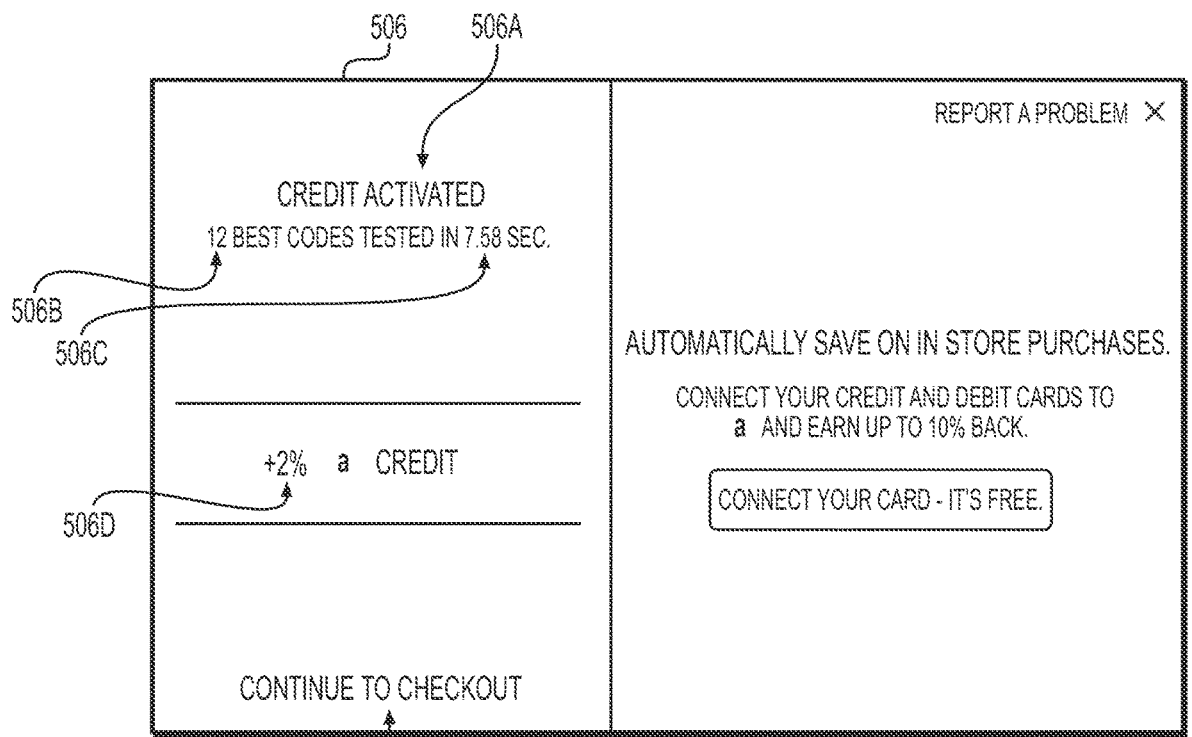
Figure 5D:
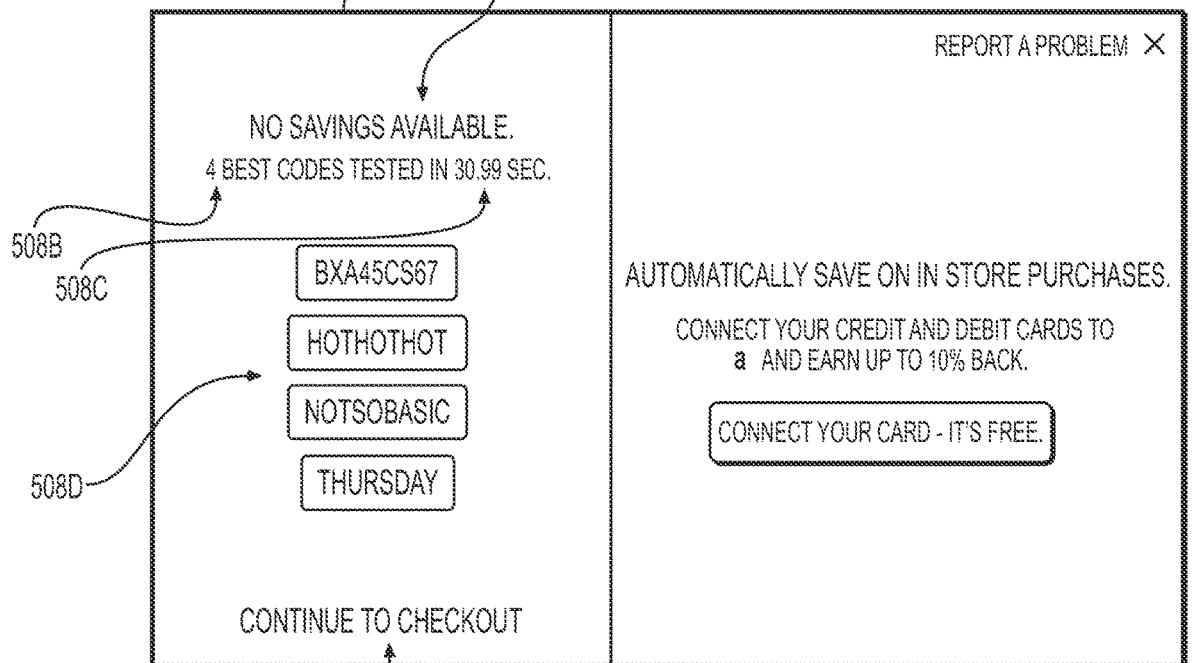

After the second code test process is completed, the browser extension may replace the second progress menu 504 (or update the second progress menu 504) with a second result menu for the second code test process. As depicted in FIGS. 5C and 5D, the second result menu may be one of a success result menu 506 or a no-savings result menu 508.

The success result menu 506 may include a test summary indicator 506A, a number of codes tested 506B, a time to test the codes 506C, a potential savings or reward offer 506D, and/or one or more action buttons, such as a continuation action button 506E. The test summary indicator 506A may be a text string summarizing a result (e.g., savings/rewards found). The number of codes tested 506B may be determined by the browser extension and displayed to the user, to inform the user of the number of codes tested during the code test process. The time to test the codes 506C may be tracked by the browser extension (e.g., from a trigger condition for the first set of codes or from a user input for the second set of codes, to the result menu being displayed to the user). The potential savings or reward offer 506D may be a text string indicating a specific savings (e.g., a dollar amount or percentage) or reward offer (either applied or to be applied on behalf of the user). The action buttons may be selectable by a user to proceed to, e.g., checkout.

The no-savings result menu 508 may include a test summary indicator 508A, a number of codes tested 508B, a time to test the codes 508C, a tested codes graphic 508D, and/or one or more action buttons, such as a continuation action button 508E. The test summary indicator 508A may be a text string summarizing a result (e.g., no savings/ rewards found). The number of codes tested 508B may be determined by the browser extension and displayed to the user, to inform the user of the number of codes tested during the code test process. The time to test the codes 508C may be tracked by the browser extension (e.g., from a trigger condition for the first set of codes or from a user input for the second set of codes, to the result menu being displayed to the user). The tested codes graphic 508D may be graphic or a text string indicating a codes that were tested during the second code test process for the second set of codes. The action buttons may be selectable by a user to proceed to, e.g., checkout.

Figure 6:
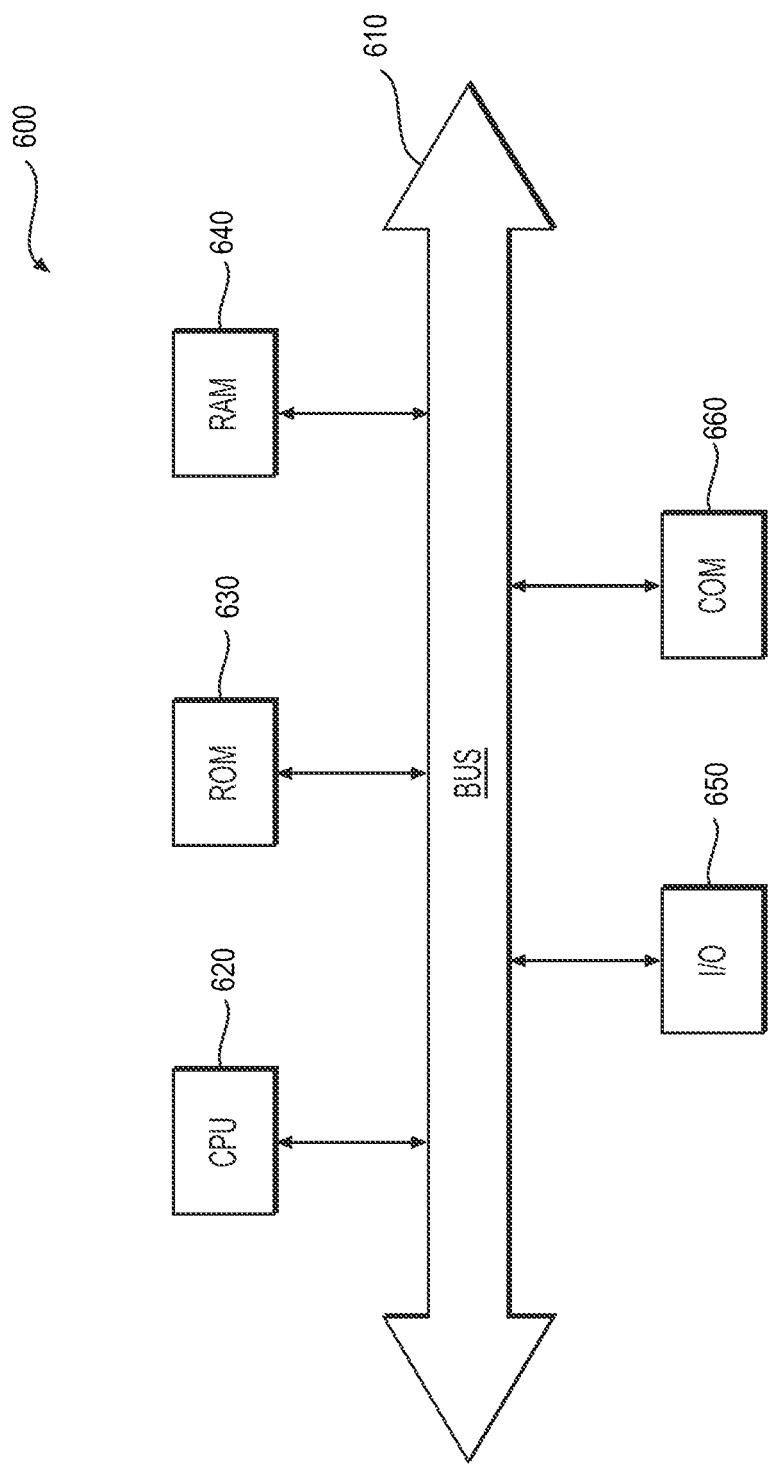
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for automatic code testing, comprising:
   monitoring a browsing session of a user on an e-commerce website;
   determining whether a trigger condition is present based on the monitoring;
   when the trigger condition is present, automatically performing a code test process by:
      obtaining a plurality of codes for the e-commerce website, each code of the plurality of codes comprising corresponding data comprising a likelihood of success and one or more of a savings amount, a last successful application, a popularity, a number of sources for each code, or a number of uses of each code;
      providing the corresponding data to a scoring machine learning model trained to output a score for each code based on the corresponding data;
      receiving a score for each code, from the scoring machine learning model;
      determining a subset number equal to a threshold period of time for the code test process divided by an average time to process a code;
      determining a first subset of codes and a second subset of codes, the first subset of codes having a maximum quantity of codes equal to the subset number of the plurality of codes and having a score higher than each of the codes of the second subset of codes, the second subset of codes corresponding to a reminder of the plurality of codes;
period of time, and
performing the code test process for the first subset of codes to obtain a first test result; and
upon completion of the code test process for the first subset of codes, displaying a first menu, the first menu including information corresponding to the first test result.

2. The method of claim 1, wherein the determining whether the trigger condition is present based on the monitoring includes:
obtaining current web page information of the browsing session;
analyzing the current web page information to determine whether code input identifiers are present; and
when the analyzing determines the code input identifiers are present, determining the trigger condition is present.

3. The method of claim 2, wherein the current web page information includes a currently viewed web page of the browsing session, a universal resource locator (URL) of the currently viewed web page, and/or network requests associated with the currently viewed web page, the currently viewed web page being displayed to the user or being about to be displayed to the user, and
the code input identifiers include one or more cascading style sheets (CSS) elements, one or more hypertext markup language (HTML) elements, and/or one or more URL elements; and
the analyzing the current web page information to determine whether the code input identifiers are present includes:
parsing the currently viewed web page to determine whether one of the one or more CSS elements and/or the one or more HTML elements are present; and
parsing the URL of the currently viewed web page and/or the network requests to determine whether one of the one or more URL elements are present.

4. The method of claim 1, wherein the performing the code test process for the first subset of codes includes:
automatically applying, sequentially or in parallel, codes of the first subset of codes to the browsing session of the user;
receiving, for each applied code of the applied codes, responses from the e-commerce website;
analyzing the responses to determine a result for each of the applied codes; and
compiling the first test result based on the determined result for each of the applied codes.

5. The method of claim 1, wherein the first menu includes:
when the first test result indicates one or more successful codes of the first subset of codes, a success indicator, the success indicator displaying a summary of savings or reward points for the one or more successful codes;
when the first test result indicates no successful codes of the first subset of codes, a no-savings indicator; or
when the first subset of codes does not include all of the plurality of codes, a continue testing indicator to test the second subset of codes.

6. The method of claim 5, further comprising:
when a continue testing indicator to test the second subset of codes is displayed in the first menu, receiving a user input to test the second subset of codes;
in response to receiving the user input to test the second subset of codes, performing the code test process for the second subset of codes to obtain a second test result; and
upon completion of the code test process for the second subset of codes, displaying a second menu, the second menu including information corresponding to the second test result.

7. The method of claim 1, further comprising, before the determining whether the trigger condition is present:
when the determining determines the e-commerce website is not one of the plurality of e-commerce websites, only performing the code test process when the trigger condition is present and a user input to proceed is received.

8. A system for automatic code testing, the system comprising:
a memory storing instructions; and
a processor executing the instructions to perform a process including:
monitoring a browsing session of a user on an e-commerce website;
determining whether a trigger condition is present based on the monitoring;
when the trigger condition is present, automatically performing a code test process by:
obtaining a plurality of codes for the e-commerce website, each code of the plurality of codes comprising corresponding data comprising a likelihood of success and one or more of a savings amount, a last successful application, a popularity, a number of sources for each code, or a number of uses of each code;
providing the corresponding data to a scoring machine learning model trained to output a score for each code based on the corresponding data;
receiving a score for each code, from the scoring machine learning model;
determining a subset number equal to a threshold period of time for the code test process divided by an average time to process a code;
determining a first subset of codes and a second subset of codes, the first subset of codes having a maximum quantity of codes equal to the subset number of the plurality of codes and having a score higher than each of the codes of the second subset of codes, the second subset of codes corresponding to a reminder of the plurality of codes;
performing the code test process for the first subset of codes to obtain a first test result; and
upon completion of the code test process for the first subset of codes, displaying a first menu, the first menu including information corresponding to the first test result.

9. The system of claim 8, wherein the process further includes, to determine whether the trigger condition is present based on the monitoring:
obtaining current web page information of the browsing session;
analyzing the current web page information to determine whether code input identifiers are present; and
when the analyzing determines the code input identifiers are present, determining the trigger condition is present.

10. The system of claim 9, wherein the current web page information includes a currently viewed web page of the browsing session, a universal resource locator (URL) of the currently viewed web page, and/or network requests associated with the currently viewed web page, the currently viewed web page being displayed to the user or being about to be displayed to the user, and the code input identifiers include one or more cascading style sheets (CSS) elements, one or more hypertext markup language (HTML) elements, and/or one or more URL elements; and wherein the process further includes, to analyze the current web page information to determine whether the code input identifiers are present:

parsing the currently viewed web page to determine whether one of the one or more CSS elements and/or the one or more HTML elements are present; and parsing the URL of the currently viewed web page and/or the network requests to determine whether one of the one or more URL elements are present.

11. The system of claim 8, wherein the process further includes, to perform the code test process for the first subset of codes:

automatically applying, sequentially or in parallel, codes of the first subset of codes to the browsing session of the user;

receiving, for each applied code of the applied codes, responses from the e-commerce website;

analyzing the responses to determine a result for each of the applied codes; and compiling the first test result based on the determined result for each of the applied codes.

12. The system of claim 8, wherein the first menu includes:

when the first test result indicates one or more successful codes of the first subset of codes, a success indicator, the success indicator displaying a summary of savings or reward points for the one or more successful codes;

when the first test result indicates no successful codes of the first subset of codes, a no-savings indicator; or when the first subset of codes does not include all of the plurality of codes, a continue testing indicator to test the second subset of codes.

13. The system of claim 12, wherein the process further includes:

when a continue testing indicator to test a second subset of codes is displayed in the first menu, receiving a user input to test the second subset of codes;

in response to receiving the user input to test the second subset of codes, performing the code test process for the second subset of codes to obtain a second test result; and after the code test process for the second subset of codes ends, displaying a second menu, the second menu including information corresponding to the second test result.

14. A method for automatic code testing, the method comprising:

monitoring a browsing session of a user on an e-commerce website;

determining whether a trigger condition is present based on the monitoring;

when the determining determines the trigger condition is present, automatically performing a code test process by:

obtaining a plurality of codes for the e-commerce website, each code of the plurality of codes comprising corresponding data comprising a likelihood of success and one or more of a savings amount, a last successful application, a popularity, a number of sources for each code, or a number of uses of each code;

scoring the plurality of codes according to a scoring algorithm, based on the corresponding data;

receiving a score for each code, based on the scoring algorithm;

determining a subset number equal to a threshold period of time for the code test process divided by an average time to process a code;

determining a first subset of codes and a second subset of codes, the first subset of codes having a maximum quantity of codes equal to the subset number of the plurality of codes and having a score higher than each of the codes of the second subset of codes, the second subset of codes corresponding to a reminder of the plurality of codes;

performing the code test process for the first subset of codes to obtain a first test result; and upon completion of the code test process for the first subset of codes, displaying a first menu, the first menu including information corresponding to the first test result.

* * * * *